United States Patent
Mao et al.

(10) Patent No.: US 11,838,405 B1
(45) Date of Patent: *Dec. 5, 2023

(54) BLOCKCHAIN DELEGATION

(71) Applicant: ArcBlock, Inc., Issaquah, WA (US)

(72) Inventors: Zhihong Mao, Issaquah, WA (US); Tian Chen, Issaquah, WA (US); Shi Shu, Issaquah, WA (US)

(73) Assignee: ArcBlock, Inc., Bellevue, WA (US)

( * ) Notice: Subject to any disclaimer, the term of this patent is extended or adjusted under 35 U.S.C. 154(b) by 8 days.

This patent is subject to a terminal disclaimer.

(21) Appl. No.: 17/650,030

(22) Filed: Feb. 4, 2022

Related U.S. Application Data

(63) Continuation of application No. 16/653,773, filed on Oct. 15, 2019, now Pat. No. 11,245,514.

(51) Int. Cl.
| | | |
|---|---|---|
| *H04L 9/40* | (2022.01) | |
| *H04L 9/06* | (2006.01) | |
| *G06F 16/23* | (2019.01) | |
| *H04L 9/32* | (2006.01) | |
| *H04L 9/30* | (2006.01) | |
| *H04L 9/00* | (2022.01) | |

(52) U.S. Cl.
CPC ........ *H04L 9/0637* (2013.01); *G06F 16/2379* (2019.01); *H04L 9/30* (2013.01); *H04L 9/3247* (2013.01); *H04L 9/50* (2022.05)

(58) Field of Classification Search
CPC ....... H04L 9/0637; H04L 9/30; H04L 9/3247; H04L 9/50; G06F 16/2379
See application file for complete search history.

(56) References Cited

U.S. PATENT DOCUMENTS

| | | | |
|---|---|---|---|
| 10,529,042 B2* | 1/2020 | Brown | G06Q 20/02 |
| 10,742,411 B2* | 8/2020 | Patel | G06F 16/24578 |
| 11,436,598 B2* | 9/2022 | Parsons | H04L 9/30 |
| 2019/0123895 A1* | 4/2019 | Blake | H04L 67/133 |
| 2019/0207757 A1* | 7/2019 | Hennebert | H04L 9/0844 |
| 2019/0306147 A1* | 10/2019 | Uhr | H04L 9/0643 |
| 2019/0347433 A1* | 11/2019 | Chakravorty | H04L 9/30 |
| 2019/0370358 A1* | 12/2019 | Nation | G06F 16/1805 |
| 2020/0051071 A1* | 2/2020 | Wu | G06Q 20/401 |
| 2020/0127826 A1* | 4/2020 | Ebrahimi | G06F 21/46 |
| 2020/0394159 A1* | 12/2020 | Hurley | G06Q 20/3827 |
| 2021/0035074 A1* | 2/2021 | Alieiev | G06Q 50/188 |
| 2021/0075870 A1* | 3/2021 | Kempf | G06F 9/5005 |
| 2021/0133729 A1* | 5/2021 | Murao | G06Q 20/3674 |

\* cited by examiner

*Primary Examiner* — Ghodrat Jamshidi

(74) *Attorney, Agent, or Firm* — Eversheds Sutherland (US) LLP

(57) ABSTRACT

Systems and methods that implement delegation on a blockchain network. A delegate blockchain transaction may be broadcasted to a blockchain network that encodes: a delegator blockchain user, a delegate blockchain user; information that indicates one or more permissions that the delegate blockchain user is authorized to perform, and an attestation that the delegator blockchain user authorizes the delegation. A delegate blockchain user may generate a blockchain transaction which is digitally signed using a delegate's private key in place of a delegator's private key.

20 Claims, 7 Drawing Sheets

BLOCKCHAIN DELEGATION

CROSS-REFERENCE TO RELATED APPLICATION

This application is a continuation of U.S. Nonprovisional application Ser. No. 16/653,773 filed Oct. 15, 2019, now U.S. Pat. No. 11,245,514, entitled "BLOCKCHAIN DELEGATION," the entire disclosure of which is hereby incorporated by reference.

BACKGROUND

Adoption of blockchain technologies in various contexts is challenging. There are many challenges that software developers and organizations face to create widespread, decentralized blockchain applications. Among them include, but are not limited to, poor performance and requirements for deeply specialized knowledge to create blockchain-based applications.

Existing blockchain applications are built for specialized software developers, creating a barrier to widespread adoption of blockchain technologies. Furthermore, ensuring that blockchain networks are secure is challenging. One such challenge involves the storing of blockchain wallets. A "hot wallet" may be an online or connected wallet which can be used to generate and broadcast digital signature to a blockchain network. However, a hot wallet may be vulnerable to digital attacks by hackers, malware, and more. Conversely, a "cold wallet" may be an offline wallet in which the private key used to generate digital signatures are not directly accessible to the Internet. Examples of cold wallets include paper wallets, flash drives (detached from computing devices while not in use), and hardware wallet devices such as TREZOR™ hardware wallet. While cold wallets are generally considered more secure in some respects—for example, they are typically considered less susceptible to computer viruses and hacking—they also have significant drawbacks compared to hot wallets, which are easier to access. Accordingly, there are several challenges with existing techniques for using hot and cold wallets in connection with storage and ownership of digital assets of a blockchain network.

BRIEF DESCRIPTION OF THE DRAWINGS

Various techniques will be described with reference to the drawings, in which.

DETAILED DESCRIPTION

Figure 1:
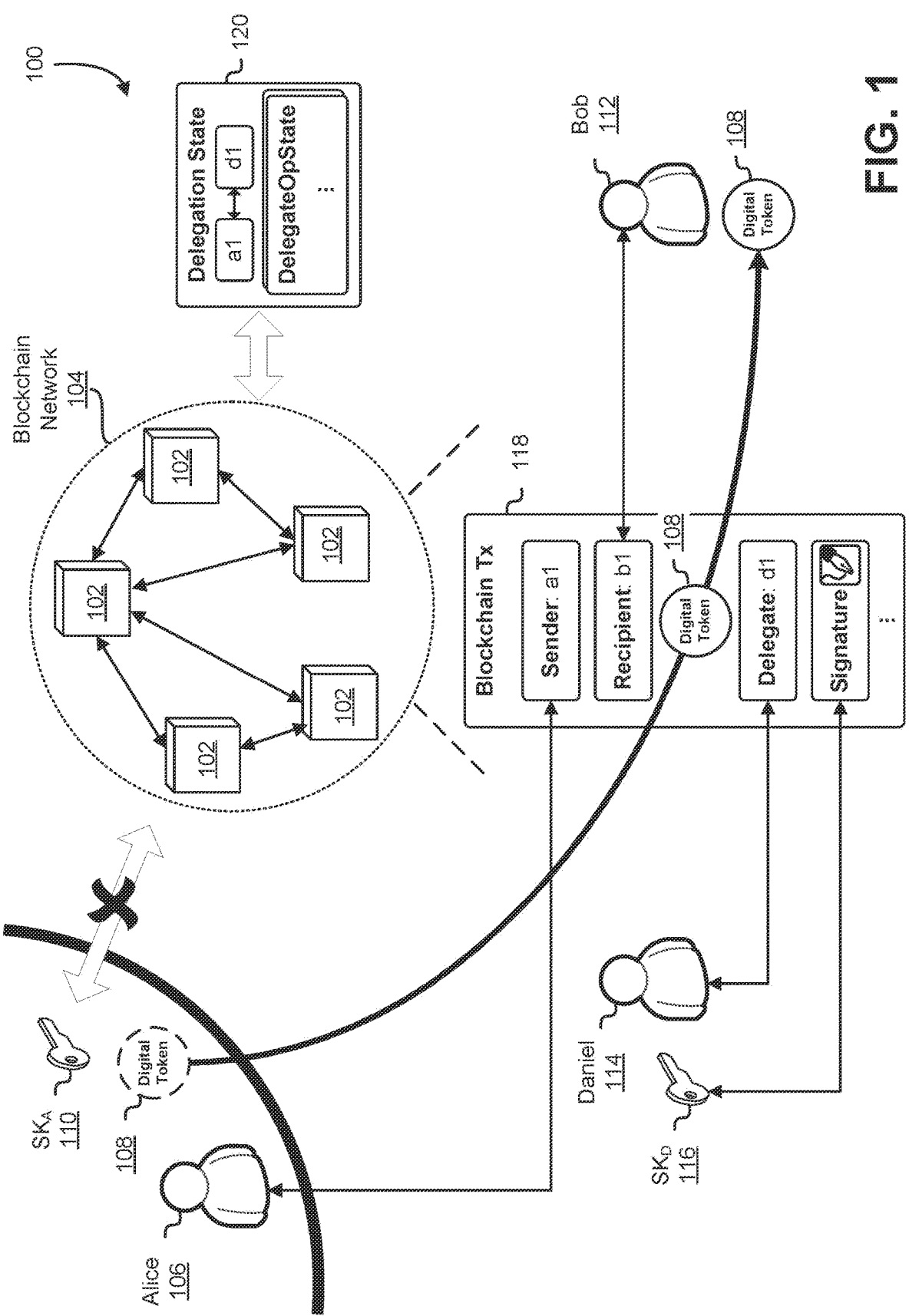
FIG. 1 illustrates an example of a computing environment, in accordance with an embodiment.

This document describes techniques for delegation of blockchain operations which can be implemented in various contexts, such as on an Ethereum, ArcBlock, or Bitcoin based blockchain network. While various blockchain networks may be described as illustrative examples, they are merely non-limiting examples of specific embodiments in which techniques described herein may be implemented.

Blockchain delegation may refer to an ability of one blockchain user to provide another blockchain user signing rights. For example, a first blockchain user may delegate signing authority to a second blockchain user for a set of operations via a delegate blockchain transaction. The delegate blockchain transaction may include encode information specifying a blockchain address of the delegator, a blockchain address of the delegate, and an array of delegate operations which defines rights and/or restrictions on the delegate's ability to stand in for the delegator.

Some or all blockchain transactions may support a delegate field. For example, a blockchain transaction that transfers control of a digital token may support a delegate field. Continuing with the example, validating the blockchain transaction may include verifying a digital signature using a public key associated with the delegate's blockchain address in place of a public key associated with the digital token owner's public key. In various embodiments, control of a digital token owned by a first blockchain user can be transferred to a second blockchain user without requiring use of the private key of the first blockchain user—this may have various security benefits, such as reducing the risk of the private key being stolen or revealed. For example, the owner of the digital token may store the private key offline in a manner that makes it difficult or impossible for the digital token owner's private key to be stolen using electronic means (e.g., malware, computer virus).

A first blockchain user may broadcast a delegate blockchain transaction to a blockchain network that indicates a second blockchain user is allowed to perform a set of operations on behalf of the first blockchain user. The delegate blockchain transaction may be digitally signed by the first blockchain user as an attestation that the first blockchain user authorizes the delegation of some or all permissions to perform operations to the second blockchain transaction. The blockchain network may receive the broadcasted delegate blockchain transaction, authenticate and validate the request, and store delegation state information that encodes the manners in which the second blockchain user may perform blockchain-related operations on behalf of the first blockchain user.

Delegation state information may be stored as state information on nodes of a blockchain network. The delegation state information may include information that specifies operations and/or types of operations that a second blockchain user can execute on behalf of a first blockchain user. For example, a second blockchain user may be delegated permissions to transfer digital assets and/or digital tokens on behalf of a first blockchain user. The delegation state information stored on the blockchain network may be the most recent delegation state.

Delegation state information may be used as part of processing blockchain transactions that include a delegate field. As an example, a blockchain transaction to transfer control of digital assets may include fields for a sender (e.g., owner), a recipient, and a digital token, among other fields. The blockchain transaction may furthermore include an optional delegate field. Additionally, the blockchain transaction may be digitally signed. The presence of a delegate field may indicate that this blockchain transaction is being submitted by the delegate on behalf of the sender.

In some cases, a node of a blockchain network processing a blockchain transaction may detect the presence of a delegate field and determine a blockchain address from which to obtain delegation state information specific to the purported sender of the blockchain transaction and the delegate The delegation state information may be examined to determine whether there exists a permission that allows the delegate blockchain user to sign the blockchain transaction on behalf of the sender blockchain user. If the delegation state information is accepted, then the digital signature over the blockchain transaction may be verified using the public key of the delegate blockchain user in place of the public key of the sender blockchain user.

In at least one embodiment, a first blockchain user generates a delegate blockchain transaction to allow a second blockchain user to perform one or more operations on behalf of the first blockchain user and digitally signs the delegate blockchain transaction with a private key. After generating the digital signature, the private key may be securely stored in an offline manner (e.g., cold wallet) which may not be readily available to a network-connected device for generating more digital signatures. While storage of the private key in this manner typically has the drawback that digital assets controlled by the first blockchain user cannot be transferred, using techniques described herein, the second blockchain user can be delegated permissions that allow for such transfers to be made, even when the first blockchain user's private key is inaccessible or even if it is lost. Accordingly, various technical challenges are solved using techniques described herein, such as the implementation of protocols in which a blockchain user's private key is securely stored in an offline manner and blockchain transactions can still be generated and broadcasted even though the blockchain user's private key may be inaccessible to blockchain network-connected computing devices.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates a computing environment 100 in which an embodiment may be practiced. The computing environment 100 may be used to implement a system that supports access to various blockchains and blockchain protocols. FIG. 1 illustrates at least one embodiment which can be implemented with nodes 102 of a blockchain network 104; a first blockchain user 106; a digital token 108; a private key 110 $SK_A$ of the first blockchain user; a second blockchain user 112; a third blockchain user 114; a private key 116 $SK_D$ of the third blockchain user; a blockchain transaction 118; and delegation state information 120. One or more computing devices such as those described in connection with FIG. 7 may be utilized in the computing environment 100.

In at least some embodiments, a blockchain network 104 refers to any and all suitable forms of distributed ledgers, which includes consensus-based blockchain and transaction-chain technologies, permissioned and un-permissioned ledgers, shared ledgers, and more. Non-limiting examples of blockchain technology include Ethereum, ArcBlock, and Bitcoin although other examples of blockchain technologies are also contemplated in the scope of this disclosure. While Ethereum, ArcBlock, and Bitcoin may be described in connection with various embodiments of this disclosure, those embodiments are to be construed merely as illustrative examples and not limiting. For example, alternative blockchain implementations and protocols are contemplated within the scope of the present disclosure. A blockchain network 104 may be an interconnected network of nodes 102 that can be independently operated and controlled by different entities, none of which has unilateral control over the operation of the blockchain network. A blockchain network 104 may be a distributed and decentralized system that can be used to execute and record blockchain transactions on an electronic ledger.

A blockchain network may make reference to a peer-to-peer electronic ledger implemented as a decentralized system and collectively managed by the nodes of the blockchain network. A ledger may comprise multiple blocks wherein a genesis block is a first block of the ledger and all other blocks reference a previous block. In at least some embodiments, each block (except the genesis block) includes a hash of the previous block to which that block became chained together to create an immutable record of the block to the blockchain ledger which cannot be modified, deleted, or otherwise altered. A block may include one or more blockchain transactions. A blockchain transaction may refer to a data structure that encodes the transfer of control of a digital asset between users of the blockchain network. For example, a blockchain transaction may transfer control of a digital asset from a source address to a destination address. A blockchain transaction may cause changes to state information stored on the blockchain network. The blockchain transaction may be signed with a private key associated with the address which can be cryptographically verified using a corresponding public key that is made available to other parties of the blockchain network. In at least one embodiment a blockchain transaction includes a transaction input and a transaction output.

A first blockchain user 106—which may be referred to as "Alice" throughout this disclosure—may be an owner of a digital token 108 wherein, in accordance with FIG. 1, control of the digital token 108 is transferred from Alice to a second blockchain user 112—which may also be referred to as "Bob" throughout this disclosure—based on a blockchain transaction 118 that a third blockchain user—which may be referred to as "Daniel" throughout this disclosure. In various embodiments, Alice may be referred to as a delegator or sender, Bob may be referred to as a recipient, and Daniel may be referred to as a delegate. Alice may be a blockchain user of blockchain network and may be associated with a blockchain address. Alice's blockchain address may be associated with a public key which is publicly available to other blockchain users, and Alice may have possession of a corresponding private key 110 $SK_A$, access to which should be secured. Alice, by virtue of possessing the private key 110 $SK_A$, can generate blockchain transactions and digitally sign them with the private key to transfer control of digital assets (e.g., digital token 108) owned by Alice to other blockchain users. Alice may control a blockchain address "a1" by virtue of having access to private key $SK_A$.

Alice's private key 110 $SK_A$ may be stored in an offline manner, such as on a cold wallet, which is not readily accessible to the blockchain network 104. In some cases the private key $SK_A$ is stored on a dedicated hardware key storage device (e.g., hardware wallet). The private key $SK_A$ may be managed in a manner that it is not network-connected unless certain circumstances dictate, such as in situations where the first blockchain user wishes to transfer all digital assets to another account (e.g., as part of a blockchain account migration). Public and private keys described herein may be in accordance with various asymmetric key cryptographic schemes, such as Elliptic-curve cryptography (ECC) and RSA (Rivest-Shamir-Adleman).

A second blockchain user 112—also referred to as "Bob" throughout this disclosure—may refer to a recipient of a blockchain transaction. In various examples, Alice is an owner of a digital token 108 which is to be transferred to Bob 112 as part of the execution of a blockchain transaction. Bob may be associated with a blockchain address at "b1" as illustrated in FIG. 1.

A third blockchain user 114—also referred to as "Daniel" throughout this disclosure—may refer to a delegate blockchain user that is authorized to perform various operations on behalf of the first blockchain user 106. In at least some embodiments, delegation state information 120 encodes one or more operations that the delegate is able to perform on behalf of the sender (e.g., owner of digital token 108). The third blockchain user may use its private key 116 $SK_D$ to generate digital signatures in place of the private key 110 $SK_A$ of the first blockchain user as part of a delegated blockchain transaction. $SK_D$ may refer to a private key of the third blockchain user's account which can be used to generate digital signatures attesting to authenticity and integrity of messages from the third blockchain user Daniel and may be associated with a blockchain address at "d1" as illustrated in FIG. 1.

Blockchain transaction 118 may include various fields such as a sender field, recipient field, digital assets to be transferred from the sender to the recipient, such as the digital token 108 illustrated in FIG. 1, a delegate field, and a digital signature generated over the blockchain transaction. Additional fields may be included in the blockchain transaction but are omitted from the illustration depicted in FIG. 1 for clarity. For example, blockchain transaction 118 may include a nonce that is used to prevent replay attacks. The blockchain transaction 118 may include a digital signature that is generated using the private key 116 $SK_D$ of the delegate account. The delegate blockchain transaction, if accepted and processed, may transfer control of digital assets controlled by the sender account based on validity of a digital signature that is purported generated by a delegate account. The sender account may, at a previous point in time, have authorized the delegate to perform one or more operations on behalf of the sender, which are stored as delegation state information 120.

Delegation state information 120 may be used to verify whether a delegate is authorized to sign a blockchain transaction on behalf of a sender. Delegation state information 120 may be accessible via a blockchain address computed based on the blockchain addresses of the sender and delegate. The delegation state information 120 may be stored on the blockchain network and accessible via the delegation address. Delegation state information may include delegate operations that specify a set of operations which are allowed or disallowed for delegation. In some embodiments, a deny-by-default policy dictates that any permissions not explicitly granted by delegate operations are not authorized. In some embodiments, the delegation state information includes a key-value map with keys that correspond to operations or types of operations and values that are a data structure representing restrictions or conditions on the performance of such operations or types of operations by the delegate. For example, the delegate may be prohibited from transferring more than a certain amount of fungible tokens over a specified period of time.

In at least some embodiments, a node of a blockchain network determining how to process blockchain transaction 118 may use the delegation state information 120 to determine whether a delegate's digital signature can be accepted in place of the sender's digital signature. The node may verify that state information for the specific delegator-delegate pair encodes a key-value mapping that indicates, for the specified transfer in the blockchain transaction, a set of conditions are satisfied by the blockchain transaction. In at least one embodiment, if the delegation state information 120 indicates that the operation is authorized to be performed by the delegate, the blockchain transaction is validated using the delegate's public key in place of the sender's public key. Accordingly, control of digital token 108 can be transferred from the first blockchain user 106 to the second blockchain user 112 based on blockchain transaction 118 which is digitally signed by the third blockchain user 114.

Figure 2:
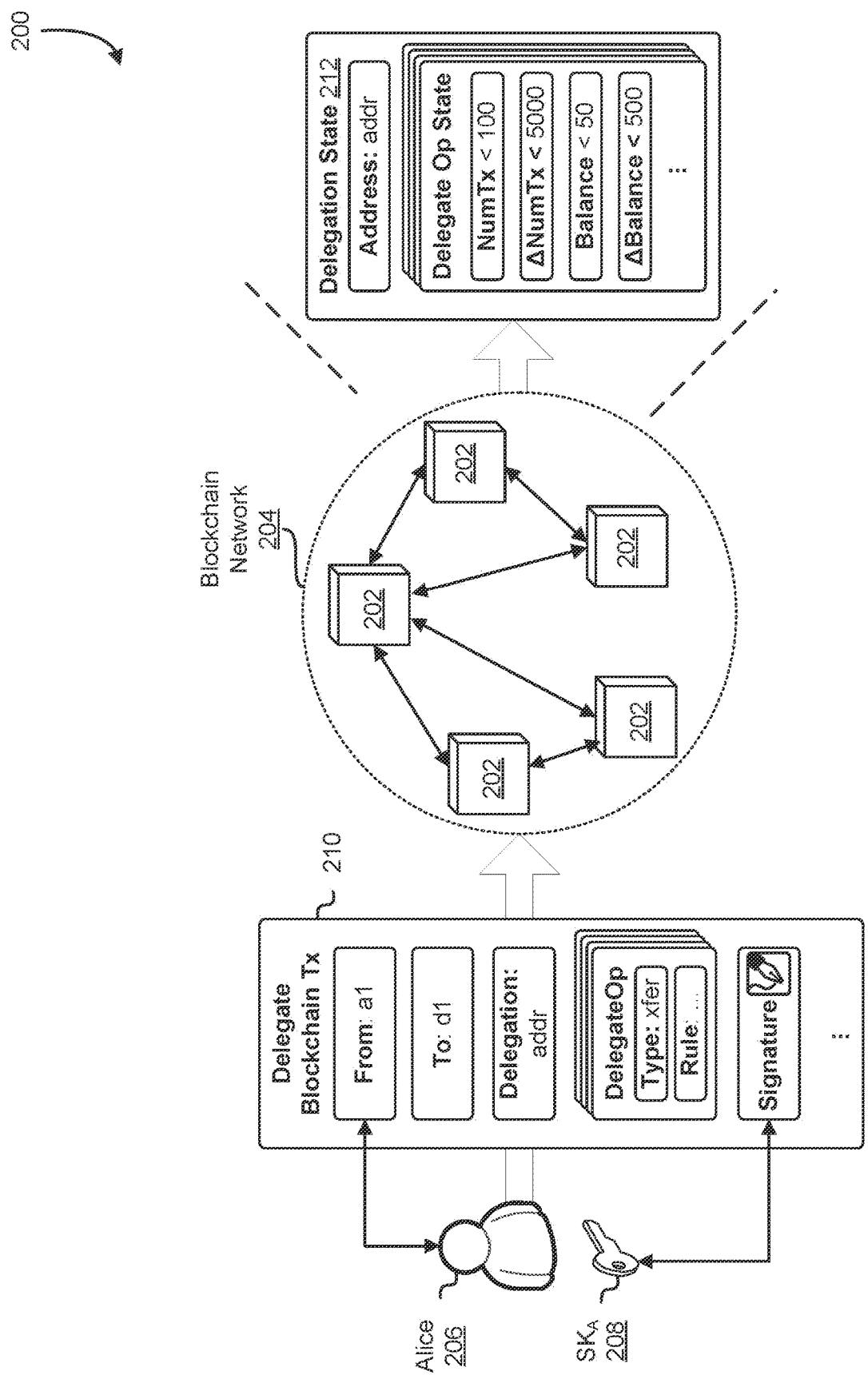
FIG. 2 illustrates a computing environment that includes a delegate blockchain transaction, in accordance with at least one embodiment.

FIG. 2 illustrates a computing environment 200 that includes a delegate blockchain transaction, in accordance with at least one embodiment. The computing environment 200 may be used to implement a system that supports access to various blockchains and blockchain protocols. FIG. 2 illustrates at least one embodiment which can be implemented with nodes 202 of a blockchain network 204; a delegator blockchain user 206; a private key 208 $SK_A$ of the delegator blockchain user; a delegate blockchain transaction 210; and delegation state information 212. One or more computing devices such as those described in connection with FIG. 7 may be utilized in the computing environment 200.

The computing environment 200 may include a blockchain network 204 comprising a plurality of interconnected nodes 202. The nodes 202 and/or blockchain network 204 may be implemented in accordance with those described elsewhere in this disclosure, such as FIGS. 1 and 4. A blockchain transaction may be written to a blockchain ledger when it is validated by a node that receives the transaction and added to a new block by a node (e.g., miner) and actually mined by adding it to the public ledger of past transactions. Validity in the blockchain context may be consensus based, and a blockchain transaction may be considered valid if a majority of nodes agrees that the blockchain transaction is valid. In at least some embodiments, a blockchain transaction is considered to be confirmed when a certain number of subsequent blocks are added to the blockchain ledger, wherein after the blockchain transaction becomes virtually irreversible.

A delegator blockchain user 206—also referred to herein as "Alice"—may refer to a blockchain user that generates and digitally signs a delegate blockchain transaction 210 that delegates at least some signing rights to another blockchain user. The delegator blockchain user may have access to a private key 208 $SK_A$ which can be used to generate attestations that authorize state changes in a blockchain network. An example of an attestation is a digital signature. An attestation may be any suitable cryptographically verifiable assurance of the nonrepudiation, authenticity, and/or integrity of a blockchain transaction. An attestation may provide cryptographically verifiable assurances of authorization to perform one or more operations encoded in a blockchain transaction. In at least some cases, a public key $PK_A$ (not shown in the Fig.)—which forms a key pair with corresponding private key $SK_A$—can be used to verify whether a purported attestation is valid or invalid. Nodes of a blockchain network may have access to public key $PK_A$ which can be used to verify the validity of purported attestations which are broadcasted to the blockchain network. In at least one embodiment according to FIG. 2, Alice is a blockchain user that controls blockchain address "a1" and Daniel is a blockchain user that controls blockchain address "d1."

A delegate blockchain transaction 210 may be a type of blockchain transaction that, if validated, processed, and confirmed, updates delegation state information 212 to allow a delegate blockchain user to digitally sign other blockchain transactions on behalf of the delegator blockchain user 206. As illustrated in FIG. 1, Alice may be a delegator blockchain user and Daniel may be a delegate blockchain user. A delegate blockchain transaction 210 may encode or otherwise include one or more fields including a From field that encodes the delegator's blockchain address, a To field that encodes the delegate's blockchain address, a delegation address which may encode a blockchain address for the delegation state information 212, and an array of DelegateOp data structures that encode a set of permissions and/or conditions on what operations or types of operations the delegate is allowed to digitally sign on behalf of the delegator. It should be noted that the names of such fields are merely illustrative and the use of other labels to identify such parameters are contemplated within the scope of this disclosure. A digital signature may be generated over the delegate blockchain transaction 210 using the private key 208 $SK_A$ of the delegator blockchain user. Delegate blockchain transaction 210 may include additional fields which are omitted from the illustration depicted in FIG. 2 for clarity. For example, delegate blockchain transaction 210 may include a nonce that is used to prevent replay attacks.

For example, in an Ethereum-based blockchain network, a transaction may be encoded in accordance with the following:

message DelegateTx {
      string address=1; // address of the delegation between
         delegator and delegate
      string to =2; // delegate's address
      repeated DelegateOp ops=3; // array of DelegateOps
         defining type rules
    }

Delegation state information 212 may be accessible via a blockchain address computed by concatenating the delegator blockchain address with the delegate blockchain address and hashing that result using one-way function. In at least one embodiment, the address is computed as sha3(concat (tx.from, tx.to))(not shown in the Fig.) wherein sha3 refers to a Secure Hash Algorithm 3 (SHA-3), concat refers to a string or bitwise concatenation operation, and tx.from and tx.to refer to the delegator and delegate blockchain addresses, respectively.

An array, list, or set of DelegateOps may be encoded in delegate blockchain transaction 210 which may be encoded as a data structure in accordance with the following:

message DelegateOp
      string type_url=1;
      repeated string rules=2;
    }

In the DelegateOp data structure, type_url (not shown in the Fig.) may refer to the type of operation or operations for which permission is being delegated for. The DelegateOp data structure may also include an array of rules that apply to the specific type_url. Each rule may encode an expression which can be parsed to a Boolean expression which can be evaluated to a TRUE or FALSE value based on an input blockchain transaction of the specified type. In some cases, the rules can be compound rules. In some cases, the rules are defined so that all rules must be satisfied—that is, each rule in the array of rules is evaluated and delegation is allowed if and only if each of the rules in the array of rules evaluates to TRUE. In various embodiments, different Boolean operators can be used to connect different rules together to form various types of Boolean expressions to evaluate the array of rules beyond combining them with AND operators.

Alice—or another blockchain user—may broadcast delegate blockchain transaction 210 to the blockchain network 204 to be validated, processed, and confirmed. Processes such as those described in connection with FIG. 6 may be utilized as part of validating the delegate blockchain transaction. For example, as part of validating and/or processing delegate blockchain transaction 210, a node of the blockchain network may receive the delegate blockchain transaction 210 and use a private key $PK_A$ of the sender to validate the digital signature.

In at least some cases, the digital signature is validated first and then the delegation blockchain address is used to access the delegation state information 212 corresponding to the particular delegator-delegate pair. The blockchain address where the delegation state information can be found may be computed as a hash of information that is composed at least in part from the delegator and delegate blockchain addresses.

Delegation state information 212 may be located at an address that is determined using suitable techniques such as those described above. For example, a hash of the delegate and delegator's address may be combined with a delegation state identifier to generate, as a hash output, the delegation address. In some cases, the delegation address is computed as a hash of just the delegator and delegate blockchain addresses. Delegation state information may be implemented in accordance with the following data structure:

message DelegateState
      string address=1;
      map<string, DelegateOpState> ops=2;
      // state context, replace existing fields
      StateContext context=14;
      // forge app can extend this
      google.protobuf.Any data=15;
    }

The address may be the blockchain address of the delegate state information as described above. The delegate state information may also include a key-value map with keys that correspond to operations or types of operations and values that are a DelegateOpState data structure representing restrictions or conditions on the performance of such operations or types of operations by the delegate. DelegateOpState data structure may include a StateContext field which may include timestamps and/or block information associated with state changes of a delegate state information. For example, state context may include the block height that includes the blockchain transaction that created the initial delegate state, and may further include block heights of subsequent blockchain transactions that modified the delegation state information (e.g., revoke blockchain transactions). In various embodiments, StateContext field includes state context information that can be used to determine the current delegation state from a series of previous blockchain transactions which modified the delegation state, which can be replayed in reverse order to determine the current delegation state. The DelegateOpState data structure may include additional data field that can be used for various purposes, such as to extend protocols. For example, the delegate may be prohibited from transferring more than a certain amount of fungible tokens over a specified period of time. Continuing with an example that uses the above DelegateState data structure described above, an example of a DelegateOpState data structure may be impended in accordance with the following data structure:

```
// a rule can check against the statistics values, e.g.
    state.num_txs<10000,
// state.balance_delta<50000, delta is calculated based on
    the configuration for interval.
message DelegateOpState
    // individual rules in DelegateTx concatenated into one
        per type_url using "AND"
    string rule=1;
    uint64 num_txs=2;
    uint64 num_txs_delta=3;
    BigUint balance=4;
    BigUintbalance_delta=5;
}
```

Each DelegateOpState may be associated with a specific type of operation. A DelegateOpState may have a rule identifier. A DelegateOpState may specify a maximum number of blockchain transactions that can be processed within a specified period of time (e.g., time delta). The time period can be specified as clock time or block height. The DelegateOpState may specify a maximum quantity of fungible tokens that can be transferred in a specified period of time (e.g., time delta) which can be a different time interval, as described above.

In at least some embodiments, a delegate is authorized to perform a specified operation in a second blockchain transaction by verifying that delegate state information 212 for the specific delegator-delegate pair encodes a key-value mapping that indicates, for the specified operations, a set of conditions which are satisfied by the second blockchain transaction. In at least one embodiment, if the delegation state information indicates that the operation is authorized to be performed by the delegate, the second blockchain transaction may be validated using the delegate's public key in place of the delegator's public key—for example, to perform verification of authenticity and integrity of digital signatures.

In some cases, the delegator blockchain user and the delegate blockchain user are the same person or organization, and that entity stores $SK_A$ in an offline mode as a precaution against network-based attacks which may attempt to infect a network-connected computer with access to $SK_A$ with malware or computer viruses. Accordingly, protection of private key $SK_A$ can be viewed as equivalent to protecting digital assets under the control of the first blockchain user. An entity may use a first account to aggregate control of digital assets. For example, an entity may create a cold wallet 'A' on a computer that is not connected to the Internet and either generate or import a private key for the account. Prior to storing the wallet on a USB drive (e.g., in encrypted format) a delegate blockchain transaction may be generated and digitally signed with the private key for the account, wherein another account is delegated permissions to make transfers of digital assets on behalf of the cold wallet. The delegate blockchain transaction may be stored on a second USB drive different from the first USB drive storing the cold wallet. In some cases, the computer system is, at this point, wiped clean (e.g., reformatted). The second USB drive may be connected to any suitable network-connected computing device and broadcasted to the blockchain network. The entity may aggregate digital assets from multiple accounts to the blockchain address of the cold wallet. Since the wallet is stored offline and the private key $SK_A$ has never been exposed to the Internet, there may be stronger assurances digital assets transferred to the cold wallet are secure from electronic-based attacks. Additionally, digital assets of the cold wallet may still be accessible to be transferred (e.g., subject to any rules imposed by the delegate blockchain transaction, if applicable) using the delegate's public key, which may be network-connected.

Figure 3:
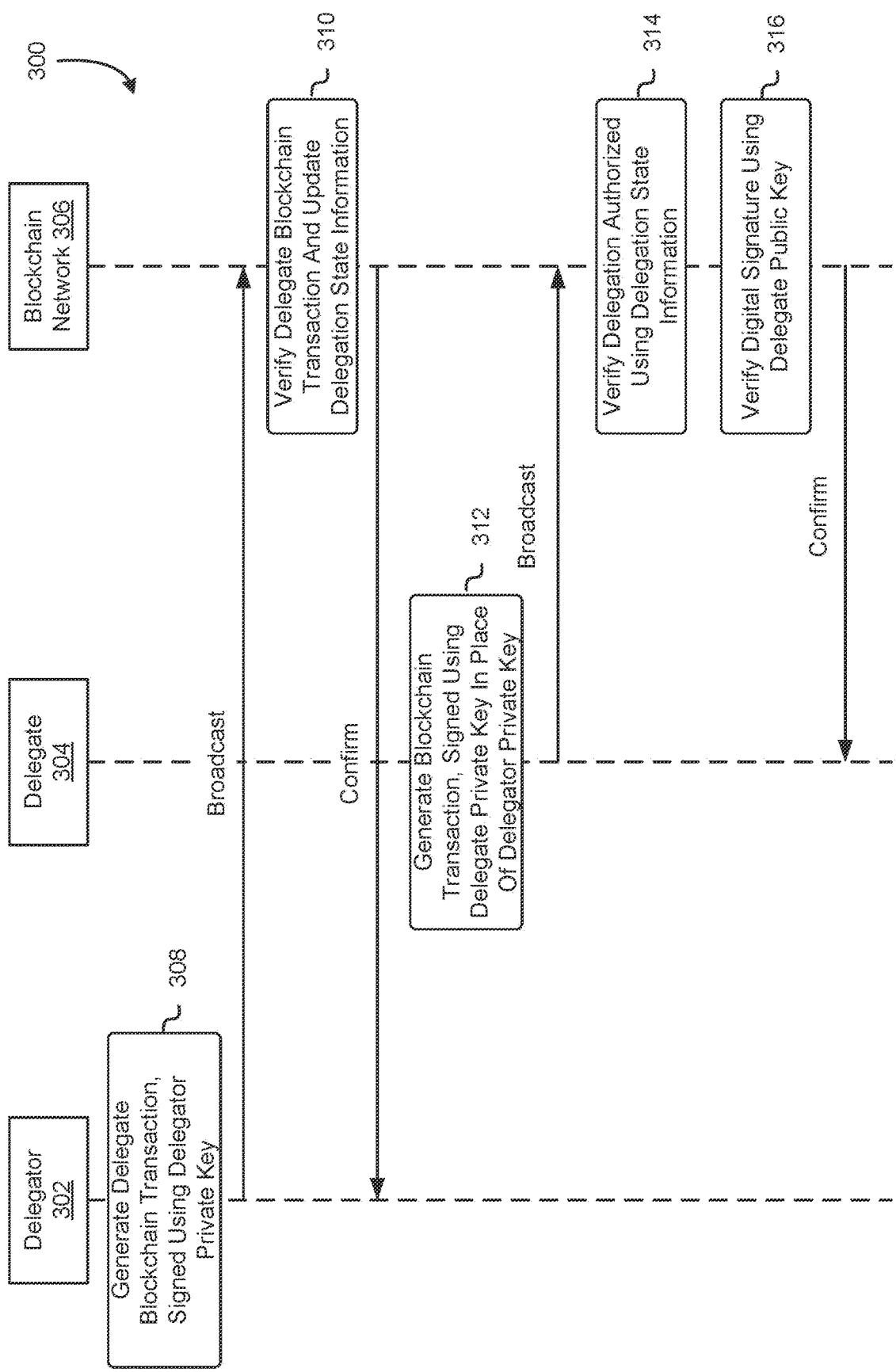
FIG. 3 illustrates a sequence diagram of blockchain delegation, in accordance with at least one embodiment.

FIG. 3 illustrates a sequence diagram 300 of blockchain delegation, in accordance with at least one embodiment. In at least one embodiment, FIG. 3 is illustrated in the context of embodiments described in connection with other figures of this disclosure. For example, FIG. 3 may be implemented in the context of embodiments discussed in connection with FIGS. 1 and 2. FIG. 3 may be implemented in the context of a computing environment that includes a delegator 302, delegate 304, and blockchain network 306.

A delegator 302 may refer to a first blockchain wallet or account. The delegator 302 may be an offline wallet wherein a private key of the delegator 302 is isolated from the blockchain network 306 to reduce or eliminate opportunities for electronic-based attacks by unauthorized entities to gain access to the private key. The delegator 302 may use an electronic process to generate 308 a delegate blockchain transaction, which may be in accordance with those described in connection with FIG. 2. The delegate blockchain transaction may encode the delegator wallet's blockchain address as a sender and the delegate's wallet address as a recipient. The delegate blockchain transaction may include a nonce. The delegate blockchain transaction may be digitally signed using the delegator's private key, which may be kept secret and used in an offline manner such that the delegate blockchain transaction is digitally signed in an offline mode wherein the computer system using the private key to generate the digital signature is operating in an offline mode which is not connected to a network (e.g., Internet) that is connected to the blockchain network 306. The delegate blockchain transaction may be broadcasted to the blockchain network 306, which may be transmitted by a computer system which does not have access to the delegator private key when the transmission is made.

The blockchain network 306 may be any suitable blockchain network such as those described in connection with FIGS. 1 and 2. The blockchain network may verify 310 the delegate blockchain transaction and update delegate state information. Verifying the delegate blockchain transaction may include verifying the digital signature using the public key associated with the delegator's wallet, which may be publicly accessible to the blockchain network 306. If the digital signature is valid according to the public key that matches the sender of the delegate blockchain transaction, the delegate blockchain transaction may be validated by accessing a corresponding delegation state information for the specific delegator-delegate pair, which may be accessible at a blockchain address that is calculated based at least in part on the delegator and delegate blockchain addresses. If the delegate blockchain transaction is valid, it may be added to a public ledger of blockchain transactions and confirmed.

A delegate 304 may refer to a wallet different from the delegator wherein at least different private keys are associated with the delegator 302 and the delegate 304. In some cases, the delegator 302 and the delegate 304 may be controlled by the same entity (e.g., business organization) wherein the delegate private key is stored in an offline mode. The delegate may generate 312 a blockchain transaction such as a blockchain transaction that encodes a transfer of digital assets from the delegator 302 to another blockchain user. Furthermore, this blockchain transaction may include a delegate field encoding the delegate's blockchain address, and a digital signature that is generated using the delegate's private key in place of the delegator's private key. In other words, the sender field of a blockchain transaction may refer to a first blockchain user and the digital signature over said blockchain transaction may be signed by a second blockchain user on behalf of the first blockchain user. In at least some embodiments, the delegate 304 is able to access the delegate state information and uses that information as part of generating the blockchain transaction—for example, if the delegate state information includes a rule that limits the total amount of fungible assets the delegate is allowed to transfer in each blockchain transaction, the delegate 304 may structure a plurality of delegated blockchain transactions that do not exceed the rule's limits. The blockchain transaction may be broadcasted to the blockchain network 306 by the delegate 304 or another suitable computing entity.

Blockchain network 306 may receive the broadcasted blockchain transaction and determine whether it is a delegated blockchain transaction by checking whether the blockchain transaction has a delegate field. If a delegate field is present (e.g., non-empty) then blockchain network 306 may access delegate state information to verify 314 whether the blockchain transaction is authorized. In some cases, the system of the blockchain network may first verify 316 that the digital signature of the blockchain transaction is valid according to the delegate's public key and then verify authorization using the delegation state information. Delegation state information may be accessed at a blockchain address that is computed based on the delegator and delegate blockchain addresses. The delegation state information may include rules and conditions that specify what types of blockchain transactions the delegate is authorized to perform, and those rules and conditions may be applied to the blockchain transaction to validate whether authorization to perform the operation was granted. If the delegate was authorized to perform the operation and the digital signature—signed by the delegate blockchain user in place of the delegator blockchain user—is valid, then the blockchain transaction may be processed, one or more blockchain states updated, and ultimately confirmed to the blockchain ledger.

Figure 4:
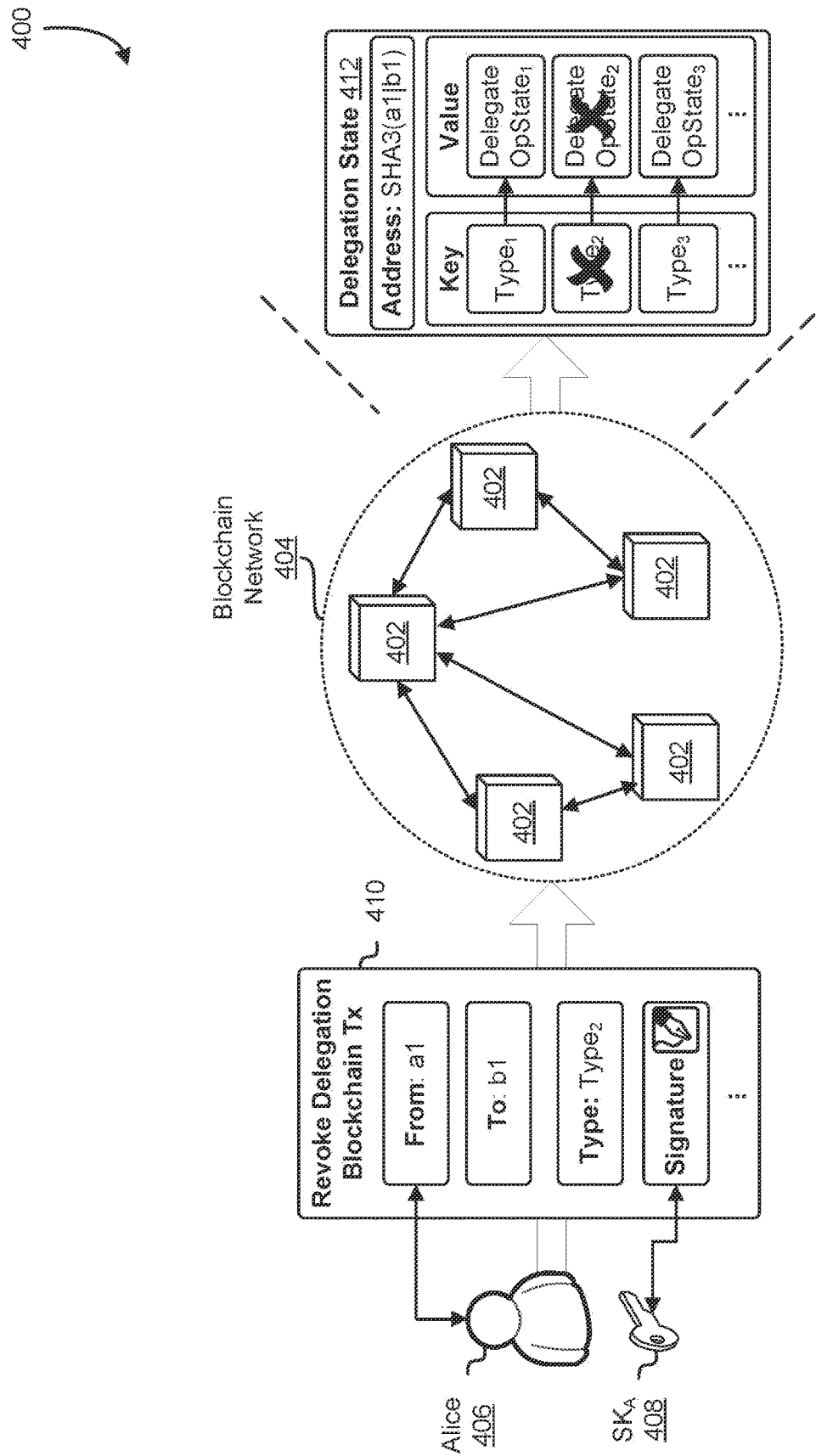
FIG. 4 illustrates a computing environment in which blockchain delegation is revoked, in accordance with at least one embodiment.

FIG. 4 illustrates a computing environment 400 in which blockchain delegation is revoked, in accordance with at least one embodiment. The computing environment 400 may be used to implement a system that supports access to various blockchains and blockchain protocols. FIG. 4 illustrates at least one embodiment that includes nodes 402 of a blockchain network 404; a delegator blockchain user 406; a private key 408 $SK_A$ of the delegator blockchain user; a revoke delegation blockchain transaction 410; and delegation state information 412. One or more computing devices such as those described in connection with FIG. 7 may be utilized in the computing environment 400.

The computing environment 400 may include a blockchain network 404 comprising a plurality of interconnected nodes 402. The nodes 402 and/or blockchain network 404 may be implemented in accordance with those described elsewhere in this disclosure, such as FIGS. 1 and 2. In some embodiments, the blockchain network 404 illustrated in FIG. 4 has previously processed and confirmed a delegate blockchain transaction—for example, using techniques described in connection with FIG. 2—to grant a delegate blockchain user permission to perform a set of operations on behalf of the delegator blockchain user 406.

A delegator blockchain user 406—also referred to herein as "Alice"—may refer to a blockchain user that generates and digitally signs a revoke delegation blockchain transaction 410 that revokes at least some signing rights that were previously delegated to another blockchain user. For example, Alice may have generated, signed, and broadcasted a delegate blockchain transaction that granted a delegate blockchain user signing rights. The delegator blockchain user may have access to a private key 408 $SK_A$ which can be used to generate attestations that authorize state changes in a blockchain network. The delegator blockchain user 406 and the private key 408 $SK_A$ may be the same or based on those described in connection with FIG. 2. In at least one embodiment according to FIG. 4, Alice is a blockchain user that controls blockchain address "a1" and Bob is a blockchain user that controls blockchain address "b1" which Alice has previously delegated one or more signing rights to.

A revoke delegation blockchain transaction 410 may be a type of blockchain transaction that, if validated, processed, and confirmed, updates delegation state information 412 to revoke one or more rights that could be used by a delegate blockchain user to digitally sign other blockchain transactions on behalf of the delegator blockchain user 406. As illustrated in FIG. 1, Alice may be a delegator blockchain user and Daniel may be a delegate blockchain user. Revoke delegation blockchain transaction 410 may encode or otherwise include one or more fields including a From field that encodes the delegator's blockchain address, a To field that encodes the delegate's blockchain address, a type field that indicates the type of operation for which signing rights are to be revoked, and a digital signature generated using private key 408 $SK_A$. Revoke delegation blockchain transaction 410 may include additional fields which are omitted from the illustration depicted in FIG. 4 for clarity. For example, revoke delegation blockchain transaction 410 may include a nonce that is used to prevent replay attacks and/or a delegation address that encodes a blockchain address for the delegation state information 412.

Delegation state information 412 may be located at an address that is determined using suitable techniques such as those described above. For example, a hash of the delegate and delegator's address may be combined with a delegation state identifier to generate, as a hash output, the delegation address. In some cases, the delegation address is computed as a hash of just the delegator and delegate blockchain addresses. Delegation state information may include a key-value map with keys that correspond to operations or types of operations and values that are a data structure representing restrictions or conditions on the performance of such operations or types of operations by the delegate. The type indicated in the revoke delegation blockchain transaction 410 may indicate a key to access and the value is deleted, thereby revoking the delegate's signing rights with respect to the particular type. In FIG. 4, revoke delegation blockchain transaction 410 indicates that signing rights delegated by Alice at blockchain address "a1" to Bob at blockchain address "b1" to perform an operation type $Type_2$ is to be revoked. The corresponding delegation state information may be obtained based at least in part on blockchain addresses "a1" and "b1" and then the type may be used to access the key-value map and the corresponding value for $Type_2$ is deleted.

Figure 5:
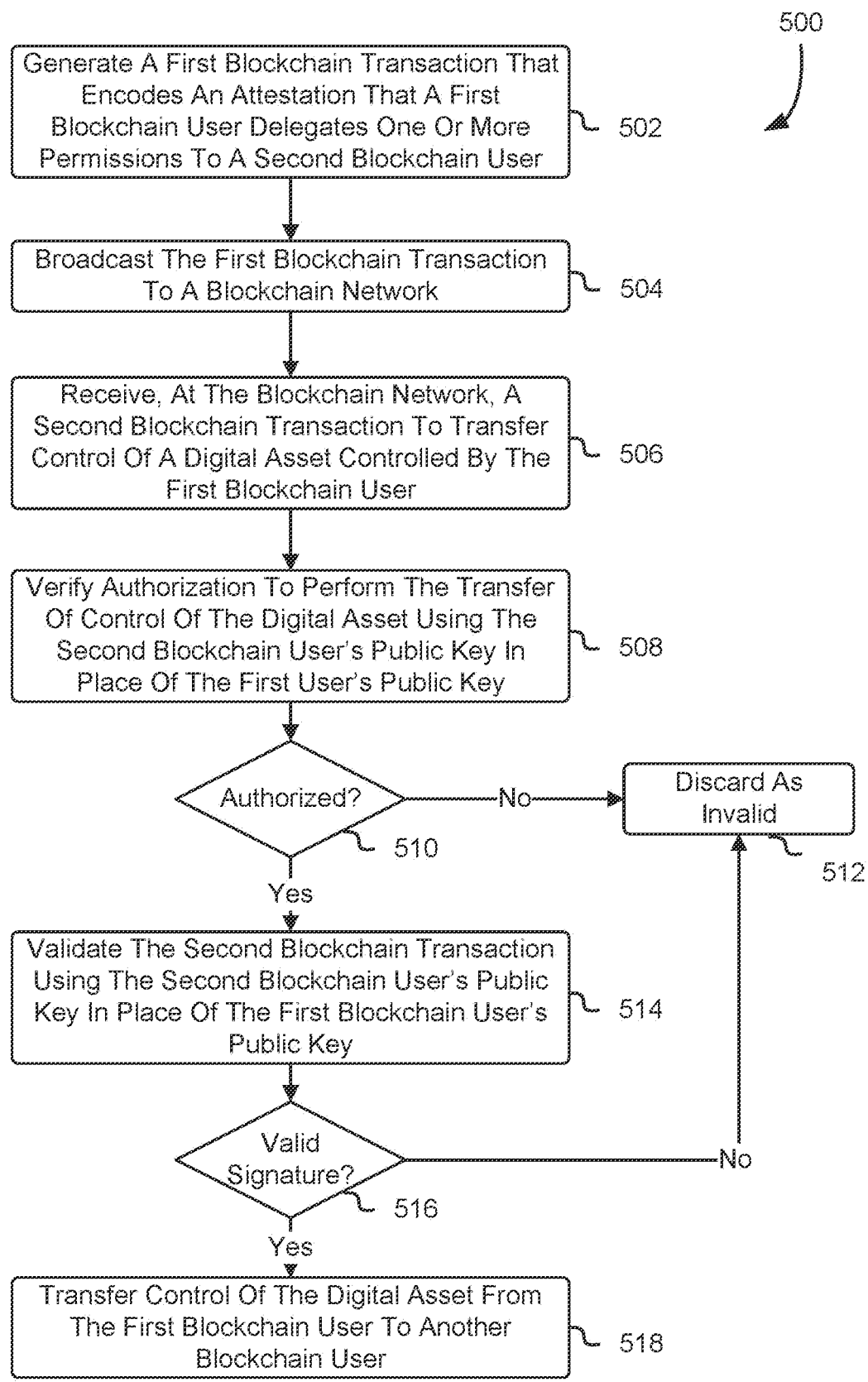
FIG. 5 illustrates a process for blockchain delegation, in accordance with at least one embodiment.

FIG. 5 shows an illustrative example of a process 500 to process a blockchain transaction with delegation, in accordance with at least one embodiment. In at least one embodiment, some or all of the process 500 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, a computer system is configured with computer-readable executable code that, as a result of execution, causes the system to perform one or more of the steps illustrated in FIG. 5. A system that is configured to perform one or more steps of process 500 may be a system that stores computer-readable executable instructions that, as a result of execution, perform one or more steps of process 500. The process 500 may be performed at least in part by a first computer system under the control of a first blockchain user that delegates the permission to perform one or more operations on the first user's behalf to a second blockchain user; a second computer system under the control of the second blockchain user to submit a second blockchain transaction as a delegator to perform the one or more operations that the second blockchain user has been delegated authorization to perform; and a blockchain network of a plurality of nodes that collectively processes and validates blockchain transactions broadcasted to the blockchain network.

A first blockchain user of a blockchain network may be an owner of digital assets (e.g., fungible or non-fungible tokens) control of which can be transferred by the first blockchain user broadcasting a blockchain transaction indicating a transfer of some or all of the owned digital assets to another blockchain user. Such a blockchain transaction may need to be digitally signed using a private key associated with the first blockchain user to be accepted by the blockchain network—failure to produce a correct digital signature may result in such as blockchain transaction being discarded as invalid. An invalid blockchain transaction may be discarded in the sense that it is not mined to a block of blockchain ledger and does not result in the transfer of the digital assets as described in the invalid blockchain transaction.

A system implementing process 500 may generate 502 a first blockchain transaction that encodes an attestation that a first blockchain user delegates one or more permissions to a second blockchain user. The first blockchain user and the second blockchain user may be under control of the same entity, such as in the case where an underlying entity (e.g., human owner or organization) stores a first private key for the first user account in an offline manner (e.g., cold wallet) and stores a second private key for the second user account in an online manner (e.g., hot wallet) that allows the second private key to be used for signing blockchain transactions in a convenient manner. The first blockchain user and the second blockchain user may be different underlying entities, such as in the case where the first blockchain user corresponds to an organization and the second blockchain user corresponds to an employee that is granted some limited rights to perform operations on behalf of the organization.

In at least one embodiment, the blockchain transaction is a delegate blockchain transaction that encodes the delegator's blockchain address, delegate's blockchain address, a set of one or more permissions to be delegated, and a digital signature over the blockchain transaction generated using the delegator's private key. The delegator may be the first blockchain user and the delegate may be the second blockchain user. The attestation may refer to and/or be inclusive of a digital signature generated using the delegator's private key. It should be noted that once the private key is used to digitally sign the delegate blockchain transaction, it may no longer be needed. For example, the private key may be stored offline after the digital signature is generated, which may be less susceptible to electronic attacks and malware than if it were stored on a network-connected device.

The first blockchain transaction may be the delegate blockchain transaction such as those described in connection with FIG. 2. In at least one embodiment, a delegate blockchain transaction encodes the delegator's blockchain address; the delegate's blockchain address; a delegation address that indicates how state information relating to the delegation is stored and/or accessed by the blockchain network; an array of one or more delegate operations which are to be granted; and a digital signature generated over the delegate blockchain transaction. A delegation address may indicate how state information relating to the delegation is stored and/or accessed by the blockchain network. For example, the delegation address may be used to query the delegation state for a specific delegator-delegate pair.

A system implementing process 500 may broadcast 504 the first blockchain transaction to a blockchain network. The blockchain network may use the delegator's public key to validate the digital signature generated over the blockchain delegate transaction as a condition for processing the delegate blockchain transaction on the blockchain ledger. If the digital signature is not valid according to the delegator's public key, the delegate blockchain transaction may be discarded. In at least some cases, there are other conditions in addition to validity of the digital signature which are verified as part of determining whether to process the delegate blockchain transaction. In at least one embodiment, the delegator account must be an active account, as opposed to a deprecated account. In at least some cases, the delegator blockchain address may be $A_1$ whereas a blockchain account migration has occurred in which blockchain account $A_1$ has migrated to blockchain account $A_2$, meaning that $A_1$ (these are not shown in the Figs.) is a deprecated blockchain account. A digital signature of a deprecated blockchain account may be unusable to generate new digital signatures, so such a blockchain transaction may be rejected as invalid. In some cases, chained delegation is not permitted—that is, a first blockchain user A cannot delegate permissions to a second blockchain user B that allows a third blockchain user C to perform operations on behalf of the first blockchain user A, even if those operations have been delegated to second blockchain user B.

The blockchain network may validate the first blockchain transaction using techniques such as those described in connection with FIGS. 2 and 6. In at least some cases, the first blockchain transaction is a delegate blockchain transaction which is validated and confirmed. As part of processing a valid delegate blockchain transaction, the blockchain network may update state information stored in association with a blockchain address that encodes the delegator-delegate relationship. The state information may store the set of permissions permitted by the delegator to the delegate in the delegate blockchain transaction, which can be used at a later point in time to validate blockchain transactions wherein the second blockchain user acts as a delegate on behalf of the first blockchain user.

After the delegate blockchain transaction is processed, the delegate (e.g., second blockchain user) may be able to generate and broadcast blockchain transactions on behalf of the delegator (e.g., first blockchain user). In at least some cases, at a later point in time, the blockchain network receives 506 a second blockchain transaction. The second blockchain transaction may encode information for a sender blockchain address, recipient blockchain address, and a delegate blockchain address. In addition, the second blockchain transaction may, for example, encode fungible tokens, address of digital assets, etc. under the control of the user at the sender blockchain address. The second blockchain transaction may be digitally signed using the private key of the delegator blockchain address.

The presence of a delegator blockchain address may indicate that the second blockchain transaction is a delegated blockchain transaction wherein permission to perform the operation is being delegated to the user at the delegate blockchain address. A node of the blockchain network processing the second transaction may access state information at a blockchain address that is determined based at least in part on the sender and delegate blockchain addresses. For example, a SHA3 hash of the sender and delegate blockchain addresses may be used to reference the delegation state information. The delegation state information may be used to verify 508 authorization to perform the requested operation. In FIG. 5, the requested operation can be a transfer of digital assets under control of the first blockchain user to a third blockchain user. Other operations and types of operations may be delegated, and FIG. 5 is merely illustrative of a blockchain transaction to transfer digital assets, which may be one among many operations or types of operations that can be delegated.

The system may operate differently based on whether 510 the second blockchain user was determined to be authorized to perform the requested operation in the second blockchain transaction on behalf of the first blockchain user. If it is not authorized, the system may discard 512 the second blockchain transaction as invalid, such as by dropping it and refusing to confirm the second blockchain transaction to a block of the blockchain ledger. If it is authorized, other checks may be performed.

The instructions to validate 514 the second blockchain transaction using the second blockchain user's public key in place of the first blockchain user's public key may refer to verifying that a digital signature generated over the second transaction was digitally signed by the delegate blockchain user rather than the sender blockchain user. Typically, a blockchain transaction is verified against the sender's public key, but in the case of delegated blockchain transactions, verification can be performed using the delegate's public key instead. Accordingly, the delegator's private key can remain in offline storage while the delegate's private key is used to generate blockchain transactions to perform authorized transfers of digital assets under the control of the delegator's blockchain account.

The delegate's public key may be used to determine 516 whether the digital signature generated over the second blockchain transaction is valid. If the digital signature was determined to be genuine and digitally signed by the delegate, then the blockchain network may accept the second blockchain transaction and transfer 518 control of digital assets or tokens specified in the second blockchain transaction to the recipient specified in the second blockchain transaction. If the digital signature was not digitally signed by the delegate using the delegate's private key, the second blockchain transaction may be discarded 512 as invalid. In some embodiments, the second blockchain transaction performs a different operation than a transfer of digital assets, which may be executed or processed based on validity of a digital signature signed using the delegate's private key in place of the delegator's private key.

Figure 6:
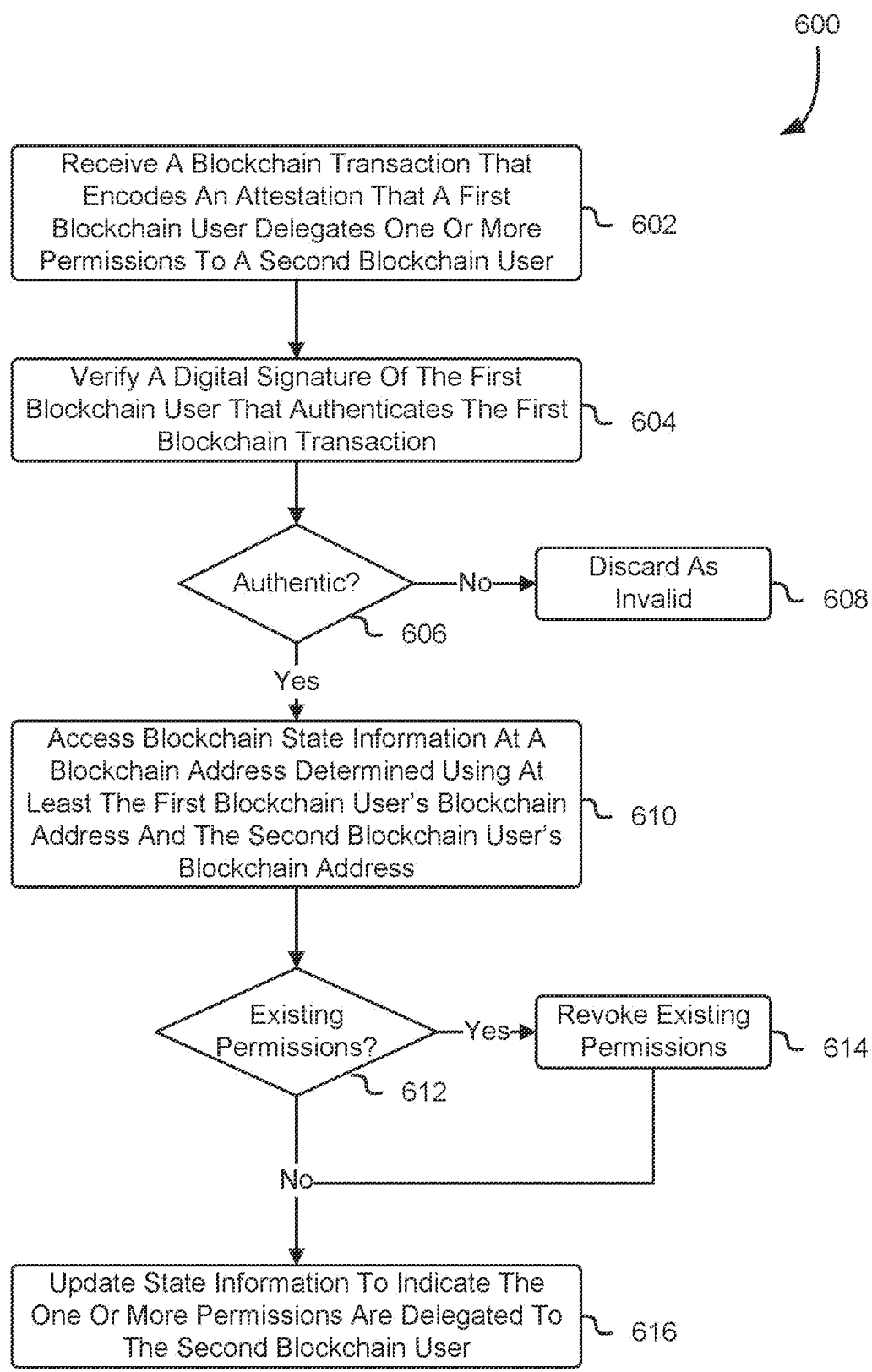
FIG. 6 illustrates a process for updating state information associated with a blockchain delegation.

FIG. 6 shows an illustrative example of a process 600 for updating state information associated with a blockchain delegation, in accordance with at least one embodiment. In at least one embodiment, some or all of the process 600 (or any other processes described herein, or variations and/or combinations thereof) is performed under the control of one or more computer systems configured with computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. In at least one embodiment, a computer system is configured with computer-readable executable code that, as a result of execution, causes the system to perform one or more of the steps illustrated in FIG. 6. A system that is configured to perform one or more steps of process 600 may be a system that stores computer-readable executable instructions that, as a result of execution, perform one or more steps of process 600. The process 600 may be performed at least in part by a first computer system under the control of a first blockchain user that delegates the permission to perform one or more operations on the first user's behalf to a second blockchain user; a second computer system under the control of the second blockchain user to submit a second blockchain transaction as a delegator to perform the one or more operations that the second blockchain user has been delegated authorization to perform; and a blockchain network of a plurality of nodes that collectively processes and validates blockchain transactions broadcasted to the blockchain network. The system performing process 600 may be one or more nodes of a blockchain network that verify blockchain transactions and add them to the blockchain ledger.

A system performing process 600 may receive 602 a blockchain transaction that encodes an attestation that a first blockchain user delegates one or more permissions to a second blockchain user. The attestation may be in the form of a digital signature generated using a private key accessible only to the first blockchain user. The private key may be associated with a public key which is publicly accessible to other blockchain users for verifying attestations purportedly generated by the first blockchain user. The blockchain transaction may be a delegate blockchain transaction in accordance with those discussed in connection with FIG. 2. The blockchain transaction may encode or otherwise include a set of permissions that are to be delegated by the first blockchain user to the second blockchain user. The delegation of a permission may allow the second blockchain user to generate digital signatures in place of those that are typically expected from the first blockchain user. For example, if a blockchain transaction encodes a transfer of a digital asset from a first blockchain user to a second blockchain user, permission to transfer the digital asset may be verified by the blockchain network. In a non-delegated blockchain transaction, a digital signature generated by the first blockchain user may be used to verify authorization, integrity, and/or authenticity of the blockchain transaction. Authorization may refer to possessing rights or permissions to perform an operation. Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted.

The blockchain transaction may include a set of delegate operations which encode a set of permissions which the delegator is allowing the delegate to perform on behalf of the delegator. For example, the set of permissions may include a permission that allows the delegate to transfer fungible assets on behalf of the delegator, subject to one or more restrictions, such as time-based and/or quantity-based limits. For example, a delegate may be limited to a certain number or amount of transfers within a specified period of time, after which the limits may be reset.

Upon receiving, at a system (which may be a blockchain network), the blockchain transaction, the system may verify 604 a digital signature generated over the blockchain transaction. The blockchain transaction may specify a delegator blockchain user, and the public key of that delegator blockchain user may be used to verify 606 whether the digital signature is authentic. If the digital signature is not valid—for example, because a private key other than the private key associated with the delegator (e.g., sender) blockchain address is used to digitally sign the blockchain transaction, the blockchain transaction may be discarded 608 as being invalid. In some cases, other criteria may be used to invalidate a blockchain transaction as well, such as in the case where the delegator blockchain address has been deprecated (e.g., due to an account migration marking the delegator blockchain address as deprecated and/or potentially compromised).

It should be noted that in some embodiments, delegation chains may be permitted. For example, if a first blockchain user delegates a set of permission to a second blockchain user via a first delegate blockchain transaction, the second blockchain user may delegate a subset (e.g., proper or otherwise) of the set of permissions to a third blockchain user via a second delegate blockchain transaction wherein the second blockchain delegate transaction has a sender field of the first blockchain user and includes a delegate field of the second blockchain user and is digitally signed by the second blockchain user. The delegate field may be used to indicate to the blockchain network to verify the digital signature of the second delegate blockchain transaction using the second blockchain user's public key rather than the first blockchain user's public key. In some cases, further chaining of delegation may be permitted. However, in some cases, no delegation is allowed—in some embodiments, a delegate blockchain transaction is not allowed to have a delegate field and/or be signed by another blockchain user on behalf of the delegator.

If the digital signature is authentic, the system may access 610 delegation state information at a blockchain address determined using at least the first blockchain user's blockchain address and the second blockchain user's blockchain address. The blockchain network may store delegation state information in association with a delegate address. In at least one embodiment, a delegation address is calculated as a SHA-3 hash of the delegator's address concatenated with the delegate's address. The delegation address may be used to reference the current delegation state between a specific delegator-delegate pair. In some embodiments, the delegation address is calculated using a hash function based on the delegator's address, delegate's address, and a third field which has a value corresponding to delegation operation (to differentiate from different types of multi-party relationships).

Delegation state information may be accessible via a blockchain address computed by concatenating the delegator blockchain address with the delegate blockchain address and hashing that result using one-way function. In at least one embodiment, the address is computed as sha3(concat (tx.from, tx.to)) wherein sha3 refers to a Secure Hash Algorithm 3 (SHA-3), concat refers to a string or bitwise concatenation operation, and tx.from and tx.to refer to the delegator and delegate blockchain addresses, respectively.

Delegation state information may include delegate operations that specify a set of operations which are allowed or disallowed for delegation. In some embodiments, a deny-by-default policy dictates that any permissions not explicitly granted by delegate operations are not authorized. In some embodiments, the delegation state information includes a key-value map with keys that correspond to operations or types of operations and values that are a data structure representing restrictions or conditions on the performance of such operations or types of operations by the delegate. For example, the delegate may be prohibited from transferring more than a certain amount of fungible tokens over a specified period of time.

In at least some embodiments, a delegate is authorized to perform a specified operation in a second blockchain transaction by verifying that state information for the specific delegator-delegate pair encodes a key-value mapping that indicates, for the specified operations, a set of conditions which are satisfied by the second blockchain transaction. In at least one embodiment, if the delegation state information indicates that the operation is authorized to be performed by the delegate, the second blockchain transaction may be validated using the delegate's public key in place of the delegator's public key.

In at least some embodiments, a node processing the blockchain transaction may check 612 whether there are any existing permissions. Checking for existing permissions may involve obtaining a set of delegate operations included in the blockchain transaction and checking whether there is a corresponding delegate operation in a key-value map stored in the delegation state information for the particular delegator-delegate pair of the delegate blockchain transaction. The set of delegate operations included in the delegate blockchain transaction may be mapped to different types, and any existing delegate state corresponding to those types are revoked, while types not included in the delegate blockchain transaction are unaffected—in this sense, the processing of a delegate blockchain transaction supersedes the previous delegation rights only if specified in the delegate blockchain transaction. Revoking 614 any existing permissions may involve overwriting an existing DelegateOpState data structure in the delegation state information with a corresponding DelegateOp data structure from the delegate blockchain transaction. As another example, as part of processing a delegate blockchain transaction, all existing delegation state information may be cleared and replaced with the list of DelegateOp included in the delegate blockchain transaction—in this sense, the processing of a delegate blockchain transaction supersedes all previous delegation rights. Once the delegate blockchain transaction is processed and applied to the blockchain ledger, the delegate may be able to perform operations on behalf of the delegator. At least based on the above, various techniques may be used to update 616 blockchain state information to indicate the one or more permissions are delegated to the second blockchain user. For example, a list of DelegateOp data structures in the delegate blockchain transaction may be stored on the blockchain network at a delegation blockchain address.

Note that one or more of the operations performed in processes described above may be performed in various orders and combinations, including parallel execution and execution in a non-deterministic order, for example. No ordering of operations of process flows illustrated in FIGS. 1-7 are necessarily indicative of relative ordering of the operations unless otherwise stated. Pre-image resistant functions include one-way functions (i.e., functions that may not be computationally difficult to compute for a current value, but may not be computationally trivial to determine a previous value from the current value), having a recurrence relationship to a previous value of the function. The one-way membership function may not be mathematically proven/provable as one-way, but have computational complexity properties that render the function pre-image resistant. One-way functions (also referred to as "effectively one-way functions") include, but are not limited to, cryptographic hash functions such as message authentication codes, (e.g., hash based message authentication code (HMAC)), key derivation functions, such as PBKDF2 and bcrypt (e.g., with the password being based at least in part on the plain text and the cryptographic key) and other secure randomization functions which may, but do not necessarily, have a domain (set of possible inputs) that is larger than their range (possible outputs). Other suitable functions (referred to as "f") for various embodiments include, but are not limited to, functions that take at least a plaintext and cryptographic key as input and that have a property of pre-image resistance (given a value y, the probability of randomly generating an input x such that $f(x)=y$ is below a specified threshold), second pre-image resistance (given an input $x_1$, the probability of randomly generating another input $x_2$, different from $x_1$, such that $f(x_1)=f(x_2)$ is below a specified threshold) and/or collision resistance (the probability of two different inputs resulting in the same output is less than a specified threshold). One-way functions suitable for use in generating an identifier for data include functions that satisfy properties of collision resistance (i.e., the probability of $f(x_1)=f(x_2)$ for different x1 and x2 is below a threshold). Other hash functions usable in accordance with the techniques of the present disclosure include, but are not limited to, functions described in the National Institute of Standards and Technology (NIST) Special Publication 800-107, Revision 1 "Recommendation for Applications Using Approved Hash Algorithms," which is incorporated herein by reference.

Note that, in the context of describing disclosed embodiments, unless otherwise specified, use of expressions regarding executable instructions (also referred to as code, applications, agents, etc.) performing operations that "instructions" do not ordinarily perform unaided (e.g., transmission of data, calculations, etc.) denote that the instructions are being executed by a machine, thereby causing the machine to perform the specified operations.

In at least some embodiments, a "blockchain" or "blockchain network" refers to any and all suitable forms of distributed ledgers, which includes consensus-based blockchain and transaction-chain technologies, permissioned and un-permissioned ledgers, shared ledgers, and more. Non-limiting examples of blockchain technology include Bitcoin, Ethereum, and ArcBlock, although other examples of blockchain technologies are also contemplated in the scope of this disclosure. While Bitcoin, Ethereum, and ArcBlock may be described in connection with various embodiments of this disclosure, those embodiments are to be construed merely as illustrative examples and not limiting. For example, alternative blockchain implementations and protocols are contemplated within the scope of the present disclosure.

A blockchain network may refer to a peer-to-peer electronic ledger implemented as a decentralized system. A ledger may comprise multiple blocks wherein a genesis block is a first block of the ledger and all other blocks reference a previous block. In at least some embodiments, each block (except the genesis block) includes a hash of the previous block to which that block became chained together to create an immutable record of the block to the blockchain ledger which cannot be modified, deleted, or otherwise altered. A block may include one or more blockchain transactions. A blockchain transaction may refer to a data structure that encodes the transfer of control of a digital asset between users of the blockchain network. For example, a blockchain transaction may transfer control of a digital asset from a source address to a destination address. The blockchain transaction may be signed with a private key associated with the address which can be cryptographically verified using a corresponding public key that is made available to other parties of the blockchain network. In at least one embodiment a blockchain transaction includes a transaction input and a transaction output.

In some embodiments, a blockchain transaction is validated before it is committed to the blockchain ledger as part of a block. Blockchain nodes may be used to verify blockchain transactions, which may include verifying digital signatures of transactions, verifying that a purported owner of a digital asset is actually the owner by inspecting the blockchain ledger to verify that control of the digital asset was transferred to the purported owner and that the purported owner has not elsewhere transferred control of the digital asset (meaning that the purported owner was previous the owner of the digital asset but has previously transferred control to another entity).

Validity in the blockchain context may be consensus based, and a transaction may be considered valid if a majority of nodes agrees that the blockchain transaction is valid. In at least some embodiments, a blockchain transaction references an unspent transaction output (UTXO) that is used to validate the transaction by executing the UTXO locking and unlocking script. If the UTXO locking and unlocking script executes successfully (e.g., by evaluating to TRUE and any other validation operations). Accordingly, a blockchain transaction is written to a blockchain ledger when it is validated by a node that receives the transaction and is added to a new block by a node (e.g., miner) and actually mined by being added to the public ledger of past transactions. In at least some embodiments, a blockchain transaction is considered to be confirmed when a certain number of subsequent blocks are added to the blockchain ledger, wherein after the blockchain transaction becomes virtually irreversible.

A blockchain transaction output may include a locking script that "locks" a digital asset by specifying a condition that is to be met in order for the encumbrance to be lifted or unlocked (e.g., to allow control of the digital asset to be transferred to another user). A locking script may be referred to as an encumbrance. An unlocking script may be a corresponding script that in combination with the locking script, removes an encumbrance on digital assets. A locking script and unlocking script may be combined to form executable code that, if executed to completion or to yield a specific result, indicates that the unlocking script is valid and that the encumbrance may be removed. For example, "scriptPubKey" is a locking script in Bitcoin and "scriptSig" is an unlocking script.

It should be noted that while blockchain technology is perhaps most widely known for its use cryptocurrency, there are many other applications for blockchain technologies for providing secure systems. A secure system may refer to a system in which functionality—such as the exchange of digital assets between two or more entities—is cryptographically verifiable. A secure system may be robust to failure. A secure system may be immutable such that information that is committed to the blockchain ledger cannot be unilaterally modified by an individual. A secure system may provide additional assurances, such as assurances of confidentiality, integrity, authenticity, and nonrepudiation. Confidentiality may refer to assurances that certain information is not made publicly available (e.g., the underlying identity of a blockchain address may be kept secret or unknown). Authenticity may refer to assurances that a message was created by a party purporting to be the author of the message. Integrity may refer to assurances that a received message was not modified either intentionally (e.g., by a malicious party) or unintentionally (e.g., as a result of signal loss during transmission) from its original form when the message was transmitted. Nonrepudiation may refer to assurances that a party that digitally signs a blockchain transaction cannot deny the authenticity of the transaction.

Figure 7:
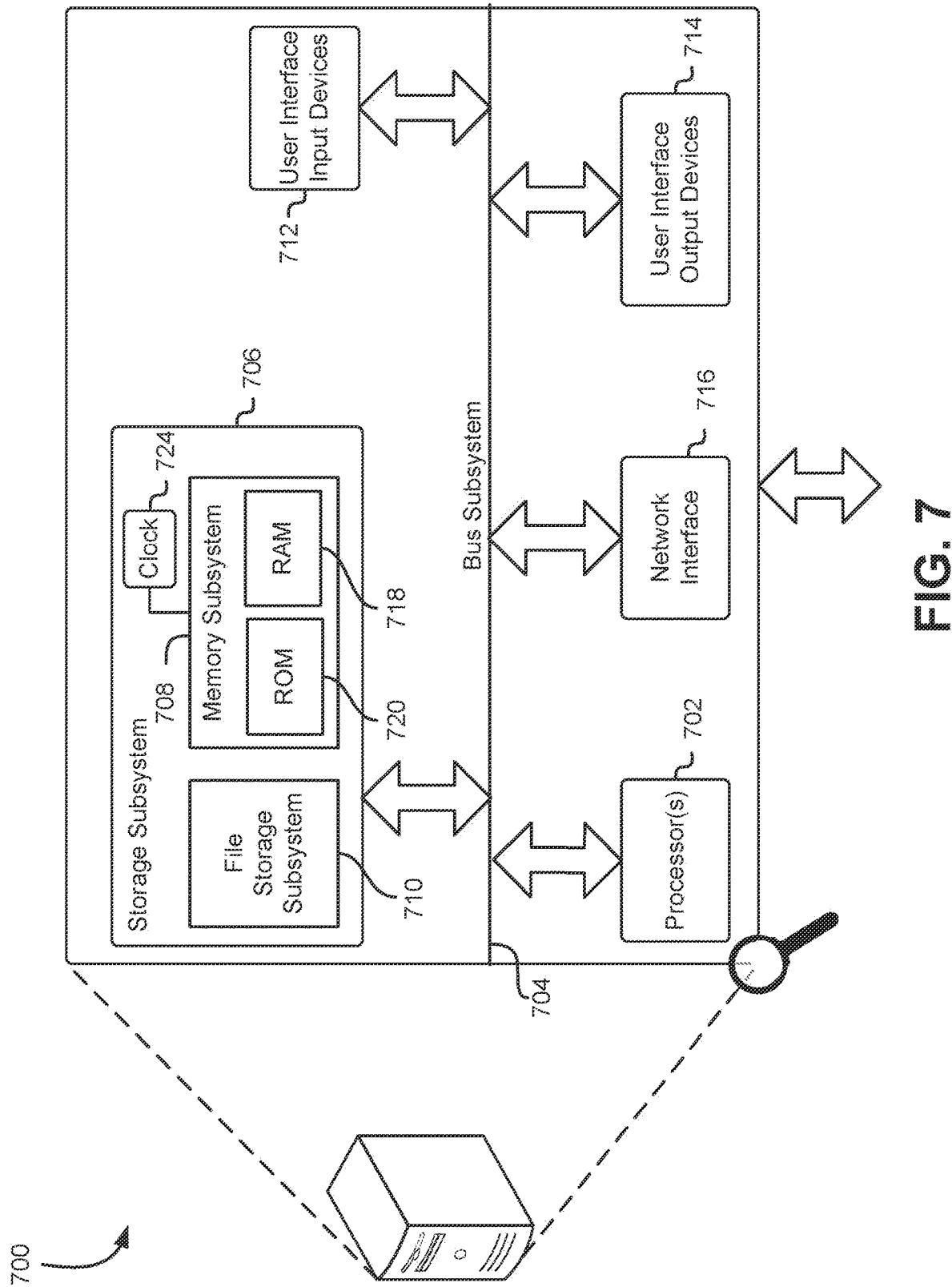
FIG. 7 illustrates an environment in which various embodiments can be implemented.

FIG. 7 is an illustrative, simplified block diagram of a computing device 700 that can be used to practice at least one embodiment of the present disclosure. In various embodiments, the computing device 700 may be used to implement any of the systems illustrated and described above. For example, the computing device 700 may be configured for use as a data server, a web server, a portable computing device, a personal computer, or any electronic computing device. As shown in FIG. 7, the computing device 700 may include one or more processors 702 that, in embodiments, communicate with and are operatively coupled to a number of peripheral subsystems via a bus subsystem. In some embodiments, these peripheral subsystems include a storage subsystem 706, comprising a memory subsystem 708 and a file/disk storage subsystem 710, one or more user interface input devices 712, one or more user interface output devices 714, and a network interface subsystem 716. Such storage subsystem 706 may be used for temporary or long-term storage of information.

In some embodiments, the bus subsystem 704 may provide a mechanism for enabling the various components and subsystems of computing device 700 to communicate with each other as intended. Although the bus subsystem 704 is shown schematically as a single bus, alternative embodiments of the bus subsystem utilize multiple buses. The network interface subsystem 716 may provide an interface to other computing devices and networks. The network interface subsystem 716 may serve as an interface for receiving data from and transmitting data to other systems from the computing device 700. In some embodiments, the bus subsystem 704 is utilized for communicating data such as details, search terms, and so on.

In some embodiments, the user interface input devices 712 includes one or more user input devices such as a keyboard; pointing devices such as an integrated mouse, trackball, touchpad, or graphics tablet; a scanner; a barcode scanner; a touch screen incorporated into the display; audio input devices such as voice recognition systems, microphones; and other types of input devices. In general, use of the term "input device" is intended to include all possible types of devices and mechanisms for inputting information to the computing device 700. In some embodiments, the one or more user interface output devices 714 include a display subsystem, a printer, or non-visual displays such as audio output devices, etc. In some embodiments, the display subsystem includes a cathode ray tube (CRT), a flat-panel device such as a liquid crystal display (LCD), light emitting diode (LED) display, or a projection or other display device. In general, use of the term "output device" is intended to include all possible types of devices and mechanisms for outputting information from the computing device 700. The one or more user interface output devices 714 can be used, for example, to present user interfaces to facilitate user interaction with applications performing processes described and variations therein, when such interaction may be appropriate.

In some embodiments, the storage subsystem 706 provides a computer-readable storage medium for storing the basic programming and data constructs that provide the functionality of at least one embodiment of the present disclosure. The applications (programs, code modules, instructions), when executed by one or more processors in some embodiments, provide the functionality of one or more embodiments of the present disclosure and, in embodiments, are stored in the storage subsystem 706. These application modules or instructions can be executed by the one or more processors 702. In various embodiments, the storage subsystem 706 additionally provides a repository for storing data used in accordance with the present disclosure. In some embodiments, the storage subsystem 706 comprises a memory subsystem 708 and a file/disk storage subsystem 710.

In embodiments, the memory subsystem 708 includes a number of memories, such as a main random access memory (RAM) 718 for storage of instructions and data during program execution and/or a read only memory (ROM) 720, in which fixed instructions can be stored. In some embodiments, the file/disk storage subsystem 710 provides a non-transitory persistent (non-volatile) storage for program and data files and can include a hard disk drive, a floppy disk drive along with associated removable media, a Compact Disk Read Only Memory (CD-ROM) drive, an optical drive, removable media cartridges, or other like storage media.

In some embodiments, the computing device 700 includes at least one local clock 724. The at least one local clock 724, in some embodiments, is a counter that represents the number of ticks that have transpired from a particular starting date and, in some embodiments, is located integrally within the computing device 700. In various embodiments, the at least one local clock 724 is used to synchronize data transfers in the processors for the computing device 700 and the subsystems included therein at specific clock pulses and can be used to coordinate synchronous operations between the computing device 700 and other systems in a data center. In another embodiment, the local clock is a programmable interval timer.

The computing device 700 could be of any of a variety of types, including a portable computer device, tablet computer, a workstation, or any other device described below. Additionally, the computing device 700 can include another device that, in some embodiments, can be connected to the computing device 700 through one or more ports (e.g., USB, a headphone jack, Lightning connector, etc.). In embodiments, such a device includes a port that accepts a fiber-optic connector. Accordingly, in some embodiments, this device is one that converts optical signals to electrical signals that are transmitted through the port connecting the device to the computing device 700 for processing. Due to the ever-changing nature of computers and networks, the description of the computing device 700 depicted in FIG. 7 is intended only as a specific example for purposes of illustrating the preferred embodiment of the device. Many other configurations having more or fewer components than the system depicted in FIG. 7 are possible.

The specification and drawings are, accordingly, to be regarded in an illustrative rather than a restrictive sense. However, it will be evident that various modifications and changes may be made thereunto without departing from the scope of the invention as set forth in the claims. Likewise, other variations are within the scope of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions and equivalents falling within the scope of the invention, as defined in the appended claims.

The use of the terms "a" and "an" and "the" and similar referents in the context of describing the disclosed embodiments (especially in the context of the following claims) is to be construed to cover both the singular and the plural, unless otherwise indicated or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values in the present disclosure are merely intended to serve as a shorthand method of referring individually to each separate value falling within the range unless otherwise indicated and each separate value is incorporated into the specification as if it were individually recited. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., could be either A or B or C, or any nonempty subset of the set of A and B and C. For instance, in the illustrative example of a set having three members, the conjunctive phrases "at least one of A, B, and C" and "at least one of A, B, and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. Further, unless stated otherwise or otherwise clear from context, the phrase "based on" means "based at least in part on" and not "based solely on." Further, unless stated otherwise or otherwise clear from context, "some embodiments" may refer to "one or more embodiments."

Operations of processes described can be performed in any suitable order unless otherwise indicated or otherwise clearly contradicted by context. Processes described (or variations and/or combinations thereof) can be performed under the control of one or more computer systems configured with executable instructions and can be implemented as code (e.g., executable instructions, one or more computer programs or one or more applications) executing collectively on one or more processors, by hardware or combinations thereof. In some embodiments, the code can be stored on a computer-readable storage medium, for example, in the form of a computer program comprising a plurality of instructions executable by one or more processors. In some embodiments, the computer-readable storage medium is non-transitory.

The use of any and all examples, or exemplary language (e.g., "such as") provided, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described, including the best mode known to the inventors for carrying out the invention. Variations of those embodiments will become apparent to those of ordinary skill in the art upon reading the foregoing description. The inventors expect skilled artisans to employ such variations as appropriate and the inventors intend for embodiments of the present disclosure to be practiced otherwise than as specifically described. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated or otherwise clearly contradicted by context.

All references, including publications, patent applications, and patents, cited are hereby incorporated by reference to the same extent as if each reference were individually and specifically indicated to be incorporated by reference and were set forth in its entirety.

What is claimed is:

1. A computer-implemented method, comprising:
    generating a first blockchain transaction, the first blockchain transaction encoding:
        a first blockchain user associated with a first private key;
        a second blockchain user associated with a second private key;
        first information indicating a grant of one or more permissions by the first blockchain user to the second blockchain user; and
        a first attestation digitally signed using the first private key;

broadcasting the first blockchain transaction to a blockchain network, wherein broadcasting the first blockchain transaction to the blockchain network causes the blockchain network to:
  store, in association with a blockchain address associated with the first blockchain user and the second blockchain user, at least the first information of the first blockchain transaction that indicates the grant of one or more permissions by the first blockchain user to the second blockchain user; and
  determining a second blockchain transaction was broadcasted to the blockchain network, wherein the second blockchain transaction encodes:
    the first blockchain user;
    the second blockchain user;
    a second attestation digitally signed using the second private key; and
    wherein validity of the second blockchain transaction is determined based at least in part on the first information indicating that the second blockchain user is authorized to use the second private key in place of the first private key for the second blockchain transaction.

2. The method of claim 1, wherein:
the first information comprises a set of conditions for the second blockchain user to be able to sign blockchain transactions on behalf of the first blockchain user; and
wherein validity of the second blockchain transaction is determined based at least in part on the second blockchain transaction satisfying the set of conditions.

3. The method of claim 2, wherein:
the set of conditions comprises a limit on a number or amount of blockchain transactions that the second blockchain user is authorized to perform on behalf of the first blockchain user over a specified period of time.

4. The method of claim 1, further comprising:
generating a third blockchain transaction, the third blockchain transaction encoding:
  the first blockchain user;
  the second blockchain user; and
  second information that revokes at least a portion of the one or more permissions; and
  a third attestation digitally signed using the first private key; and
broadcasting, after the broadcasting of the first blockchain transaction, the third blockchain transaction, wherein the broadcasting of the third blockchain transaction causes the first information to be updated according to the second information.

5. The method of claim 1, wherein the first blockchain user and the second blockchain user are controlled by a common entity.

6. The method of claim 1, wherein the blockchain network is an Ethereum-based or ArcBlock-based blockchain network.

7. A system, comprising:
one or more processors; and
memory storing a set of instructions that, as a result of execution by the one or more processors, cause the system to:
  generate a first blockchain transaction, the first blockchain transaction encoding:
    a first blockchain user associated with a first private key;
    a second blockchain user associated with a second private key;
    first information indicating a grant of one or more permissions by the first blockchain user to the second blockchain user; and
    a first attestation digitally signed using the first private key;
  broadcast the first blockchain transaction to a blockchain network, wherein the first blockchain transaction being broadcasted to the blockchain network causes the blockchain network to:
    store, in association with a blockchain address associated with the first blockchain user and the second blockchain user, at least the first information of the first blockchain transaction that indicates the grant of one or more permissions by the first blockchain user to the second blockchain user; and
  determine a second blockchain transaction was broadcasted to the blockchain network, wherein the second blockchain transaction encodes:
    the first blockchain user;
    the second blockchain user;
    a second attestation digitally signed using the second private key; and
    wherein validity of the second blockchain transaction is determined based at least in part on the first information indicating that the second blockchain user is authorized to use the second private key in place of the first private key for the second blockchain transaction.

8. The system of claim 7, wherein:
the first information comprises a set of conditions for the second blockchain user to be able to sign blockchain transactions on behalf of the first blockchain user; and
wherein validity of the second blockchain transaction is determined based at least in part on the second blockchain transaction satisfying the set of conditions.

9. The system of claim 8, wherein:
the set of conditions comprises a limit on a number or amount of blockchain transactions that the second blockchain user is authorized to perform on behalf of the first blockchain user over a specified period of time.

10. The system of claim 7, wherein the first information comprises at least one of:
a maximum limit to how many blockchain transactions the second blockchain user is allowed to submit on behalf of the first blockchain user within a first period of time; and
a maximum limit of a value of fungible tokens that the second blockchain user is allowed to submit on behalf of the first blockchain user within a second period of time.

11. The system of claim 7, wherein the second blockchain transaction encodes:
the first blockchain user as a sender;
the second blockchain user as a delegate;
a digital asset controlled by the first blockchain user;
a third blockchain user as a recipient of the digital asset; and
the second attestation as authorization to transfer control of the digital asset from the first blockchain user to the third blockchain user.

12. The system of claim 7, wherein the first blockchain user and the second blockchain user are controlled by different entities.

13. A non-transitory computer-readable storage medium storing executable instructions that, as a result of execution by one or more processors of a computer system, cause the computer system to:

obtain a first blockchain transaction, the first blockchain transaction encoding:
  a first blockchain user associated with a first private key;
  a second blockchain user associated with a second private key;
  first information indicating a grant of one or more permissions by the first blockchain user to the second blockchain user; and
  a first attestation digitally signed using the first private key;
verify authenticity of the first attestation using a first public key corresponding to the first private key;
contingent upon the first attestation being authentic, store delegation information, wherein the delegation information is based at least in part on the first information;
obtain, after having previously obtained the first blockchain transaction, a second blockchain transaction that encodes:
  the first blockchain user;
  the second blockchain user; and
  a second attestation digitally signed using the second private key; and
determine, based on the one or more permissions and the second blockchain transaction, that the second blockchain user is authorized to sign the second blockchain transaction on behalf of the first blockchain user; and
contingent upon the determination, verify authenticity of the second attestation using a second public key corresponding to the second private key.

14. The non-transitory computer-readable storage medium of claim 13, wherein the instructions include further instructions that, as a result of execution by the one or more processors, cause the computer system to:
  obtain, after having previously obtained the first blockchain transaction, a third blockchain transaction that encodes:
    the first blockchain user;
    the second blockchain user; and
    a third attestation digitally signed using the second private key;
  determine, based on the one or more permissions and the third blockchain transaction, that the second blockchain user is not authorized to sign the third blockchain transaction on behalf of the first blockchain user; and
  discard the third blockchain transaction as invalid.

15. The non-transitory computer-readable storage medium of claim 14, wherein:
  the second blockchain transaction encodes a first amount of digital assets to transfer;
  the third blockchain transaction encodes a second amount of digital assets to transfer; and
  the one or more permissions prohibits the second blockchain user from transferring more than a threshold amount of digital assets, wherein the threshold amount is greater than the first amount and is less than the second amount.

16. The non-transitory computer-readable storage medium of claim 13, wherein the instructions include further instructions that, as a result of execution by the one or more processors, cause the computer system to:
  obtain, after having obtained the first blockchain transaction, a third blockchain transaction, a third blockchain transaction that encodes:
    the first blockchain user;
    the second blockchain user;
    second information that revokes at least a portion of the one or more permissions granted to the second blockchain user based at least in part on the first blockchain transaction; and
    a third attestation digitally signed using the first private key;
  verify validity of the third attestation based at least in part on the first public key;
  access the delegation information; and
  update the delegation information to revoke the one or more permissions.

17. The non-transitory computer-readable storage medium of claim 13, wherein the second blockchain transaction encodes the second blockchain user as a delegate of the first blockchain user.

18. The non-transitory computer-readable storage medium of claim 13, wherein the first blockchain user and the second blockchain user are controlled by a same organization.

19. The non-transitory computer-readable storage medium of claim 13, wherein the computer system operates as a node of a blockchain network.

20. The non-transitory computer-readable storage medium of claim 13, wherein:
  the first information comprises a set of conditions for the second blockchain user to be able to sign blockchain transactions on behalf of the first blockchain user; and
  wherein validity of the second blockchain transaction is determined based at least in part on the second blockchain transaction satisfying the set of conditions.

* * * * *